(12) United States Patent
Kim et al.

(10) Patent No.: US 12,462,182 B2
(45) Date of Patent: Nov. 4, 2025

(54) COMPUTING DEVICE AND QUANTUM COMPUTING SYSTEM COMPRISING SAME

(71) Applicant: LG ELECTRONICS INC., Seoul (KR)

(72) Inventors: Dongho Kim, Seoul (KR); Seungjong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 277 days.

(21) Appl. No.: 18/032,056

(22) PCT Filed: Oct. 14, 2020

(86) PCT No.: PCT/KR2020/014005
§ 371 (c)(1),
(2) Date: Apr. 14, 2023

(87) PCT Pub. No.: WO2022/080521
PCT Pub. Date: Apr. 21, 2022

(65) Prior Publication Data
US 2023/0385680 A1    Nov. 30, 2023

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ................................ G06N 10/70; G06N 10/20
See application file for complete search history.

(56) References Cited

U.S. PATENT DOCUMENTS

| | | |
|---|---|---|
| 2007/0239366 A1 | 10/2007 | Hilton |
| 2018/0260245 A1 | 9/2018 | Smith |
| 2018/0276555 A1* | 9/2018 | Weichenberger ...... G06N 10/60 |
| 2019/0340532 A1* | 11/2019 | Ducore .................. G06F 8/443 |

OTHER PUBLICATIONS

PCT International Application No. PCT/KR2020/014005, International Search Report dated Jul. 13, 2021, 5 pages.
Cramer, Julia "Quantum error correction with spins in diamond", doctoral thesis, Delft University of Technology, Jun. 2016, <http://repository.tudelft.nl/islandora/object/uuid%3A73f63a00-972d-4b83-8c9f-cce7dc14e048>, 168 pages.

(Continued)

*Primary Examiner* — Ibrahim Siddo
(74) *Attorney, Agent, or Firm* — LEE, HONG, DEGERMAN, KANG & WAIMEY

(57) ABSTRACT

The present disclosure relates to a computing device and a quantum computing system comprising same. The computing device according to an embodiment of the present disclosure comprises: a converter which converts data based on the first domain into data based on the second domain, the second domain being a quantum domain; a first interface which outputs, to a quantum processor, the data based on the second domain from the converter; a second interface to which data processed by the quantum processor is received; and an error mitigator which performs error mitigation processing of data received from the second interface. Accordingly, errors occurring in the quantum domain can be reduced.

20 Claims, 18 Drawing Sheets

(56) References Cited

OTHER PUBLICATIONS

Peter D. Johnson et al., "QVECTOR: an algorithm for device-tailored quantum error correction", arXiv:1711.02249v1, Nov. 2017, <http://arxiv.org/abs/1711.02249v1>, 18 pages.
Scott E. Smart et al., "Quantum-classical hybrid algorithm using an error-mitigating N-representability condition to compute the Mott metal-insulator transition", arXiv:2004.07739v1, Apr. 2020, <https://arxiv.org/abs/2004.07739v1>, section 2-3, 7 pages.

* cited by examiner $$x_z = r \sin \theta_z \cos \varphi_x$$

$$y_z = r \sin \theta_z \sin \varphi_x$$

$$z_z = r \cos \theta_z$$

$$x_x = r \cos \theta_x$$

$$y_x = r \sin \theta_x \cos \varphi_y$$

$$z_x = r \sin \theta_x \sin \varphi_y$$

$$x_y = r \sin \theta_y \cos \varphi_z$$
$$y_y = r \cos \theta_y$$
$$z_y = r \sin \theta_y \sin \varphi_z$$

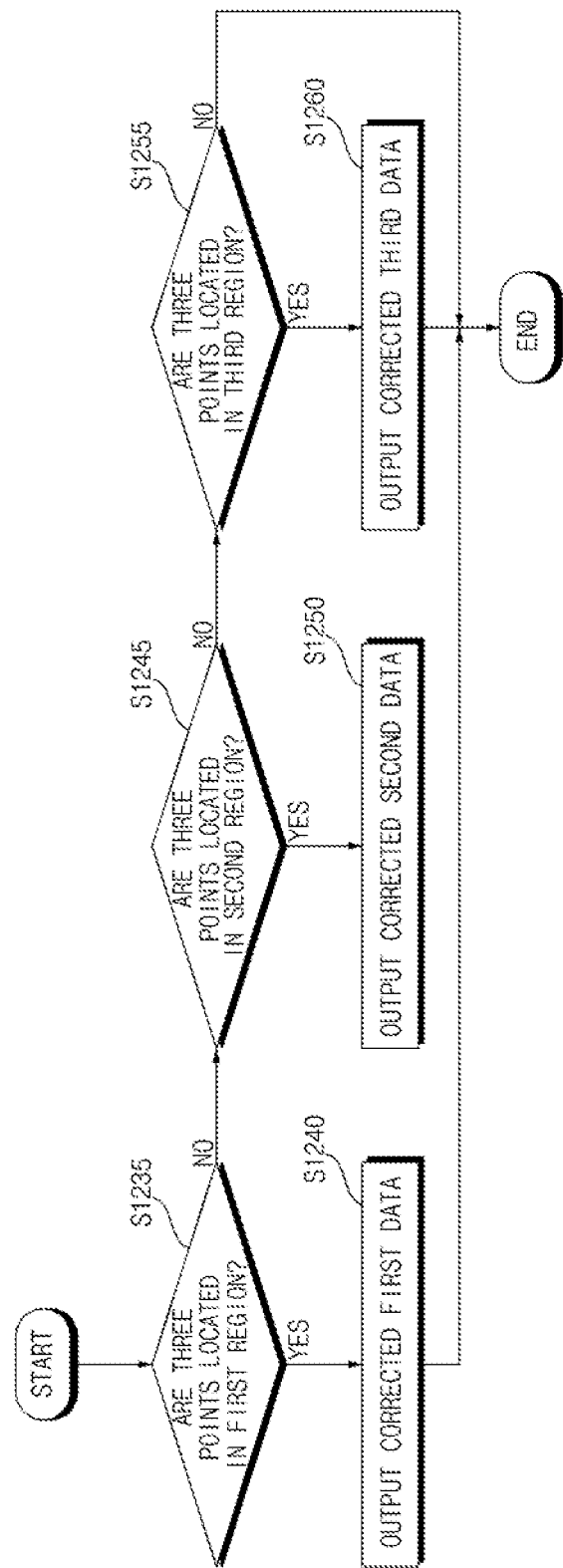

COMPUTING DEVICE AND QUANTUM COMPUTING SYSTEM COMPRISING SAME

CROSS-REFERENCE TO RELATED APPLICATIONS

This application is the National Stage filing under 35 U.S.C. 371 of International Application No. PCT/KR2020/014005, filed on Oct. 14, 2020, the contents of which are all incorporated by reference herein in their entirety.

BACKGROUND

1. Field

The present disclosure relates to a computing device and a quantum computing system including the same, and more particularly to a computing device capable of reducing errors occurring in a quantum domain, and a quantum computing system including the computing device.

2. Description of the Related Art

A quantum computing device outputs computed data by using the Bloch sphere which is a geometrical representation of spins and qubits.

Meanwhile, in order for the quantum computing device to perform quantum computing, data conversion or information conversion is required between a classical computing device in a classical domain and a quantum computing device in a quantum domain.

In a recently published paper, "Expressibility and entangling capability of parameterized quantum circuits for hybrid quantum-classical algorithms" (May of 2019) (hereinafter referred to as a "prior art"), a Hybrid Quantum Classical (HQC) algorithm is used in Noise Intermediate-Scale Quantum (NISQ).

In the HQC algorithm disclosed in the prior art, information transmission from the quantum domain to the classic domain is incomplete, and a considerable portion of information is lost. Particularly, only one quantum processor is implemented, thereby limiting transmission of information from the quantum domain the classical domain.

Further, the prior art has a drawback in that when the HQC algorithm is implemented, it is preferable that a gate depth in the quantum domain increases, but qubit accuracy is reduced due to gate errors, and particularly, the errors are accumulated as the gate depth increases, thereby reducing the accuracy of quantum computing operations.

SUMMARY

It is an objective of the present disclosure to provide a computing device capable of reducing errors occurring in a quantum domain, and a quantum computing system including the computing device.

Meanwhile, it is another objective of the present disclosure to provide a computing device capable of reducing information loss due to single-axis observation during quantum processing, and a quantum computing system including the computing device.

Meanwhile, it is yet another objective of the present disclosure to provide a computing device capable of improving fidelity by reducing errors accumulated with an increase in gate depth during quantum processing, and a quantum computing system including the computing device.

In order to achieve the above objectives, a computing device according to an embodiment of the present disclosure includes: a conversion device configured to convert data based on a first domain into data based on a second domain corresponding to a quantum domain; a first interface configured to output the data based on the second domain from the conversion device to a quantum processing device; a second interface configured to receive data processed by the quantum processing device; and an error mitigator configured to perform error mitigation on the data received from the second interface.

Meanwhile, the error mitigator may receive observed data in x-axis, y-axis, and z-axis from the quantum processing device, and may perform the error mitigation by using the observed data.

Meanwhile, the error mitigator may be configured to: in response to three points in the observed data or vectors corresponding to the three points being located in a first region, output first data obtained by correcting the observed data; in response to the three points in the observed data or the vectors corresponding to the three points being located in a second region different from first region, output second data obtained by correcting the observed data; and in response to the three points in the observed data or the vectors corresponding to the three points being located in a third region different from second region, output third data obtained by correcting the observed data.

Meanwhile, in response to the quantum processing device outputting the observed data projected onto the x-axis, y-axis, and z-axis, the error mitigator may calculate three vector values on a Bloch Sphere based on the observed data, and may output data corrected based on the calculated three vector values.

Meanwhile, the computing device may further include an optimizer configured to feed back data, modified based on the data corrected by error mitigation by the error mitigator, to the quantum processing device.

Meanwhile, by performing a cost function-based minimization or maximization based on the corrected data, the optimizer may feed back the modified data to the quantum processing device.

Meanwhile, in response to the quantum processing device comprising parallel quantum processors, the error mitigator may receive data which are observed by the parallel quantum processors of the quantum processing device, and may perform error mitigation by using the observed data.

Meanwhile, the conversion device may perform gate conversion according to set gate depth for converting the data based on the first domain into the data based on the second domain.

Meanwhile, the conversion device may include: a first axis converter configured to convert the data based on the first domain into the data based on the second domain in the x-axis; a second axis converter configured to convert the data based on the first domain into the data based on the second domain in the y-axis; and a third axis converter configured to convert the data based on the first domain into the data based on the second domain in the z-axis.

Meanwhile, the first interface may include: a first output device configured to output a first instruction queue based on the data based on the second domain in the x-axis which is received from the first axis converter; a second output device configured to output a second instruction queue based on the data based on the second domain in the y-axis which is received from the second axis converter; and a third output device configured to output a third instruction queue based on the data based on the second domain in the z-axis which is received from the third axis converter.

Meanwhile, a quantum computing system according to an embodiment of the present disclosure includes a computing device and a quantum processing device, wherein the computing device includes: a conversion device configured to convert data based on a first domain into data based on a second domain corresponding to a quantum domain; a first interface configured to output, to the quantum processing device, the data based on the second domain from the conversion device; a second interface configured to receive data processed by the quantum processing device; and an error mitigator configured to perform error mitigation on the data received from the second interface.

Meanwhile, the quantum processing device may output observed data in x-axis, y-axis, and z-axis based on the data based on the second domain.

Meanwhile, the quantum processing device may include: a first quantum processor configured to output observed data in the x-axis based on the data based on the second domain; a second quantum processor configured to output observed data in the y-axis based on the data based on the second domain; and a third quantum processor configured to output observed data in the z-axis based on the data based on the second domain.

Meanwhile, the first quantum processor to the third quantum processor may operate in parallel independently of each other.

Meanwhile, the quantum processing device may include a quantum processor which, based on the data based on the second domain, is configured to output the observed data in the x-axis at a first time, to output the observed data in the y-axis at a second time after the first time, and to output the observed data in the z-axis at a third time after the second time.

Meanwhile, the first interface may include a parallel-serial output device configured to sequentially output a first instruction queue corresponding to the data based on the second domain in the x-axis, a second instruction queue corresponding to the data based on the second domain in the y-axis, and a third instruction queue corresponding to the data based on the second domain in the z-axis.

Meanwhile, an operating temperature of the quantum processing device may be preferably lower than an operating temperature of the computing device.

Meanwhile, the operating temperature of the quantum processing device may be preferably −270° C. or less.

EFFECTS OF THE DISCLOSURE

A computing device according to an embodiment of the present disclosure includes: a conversion device configured to convert data based on a first domain into data based on a second domain corresponding to a quantum domain; a first interface configured to output the data based on the second domain from the conversion device to a quantum processing device; a second interface configured to receive data processed by the quantum processing device; and an error mitigator configured to perform error mitigation on the data received from the second interface. Accordingly, errors occurring in the quantum domain may be reduced. Further, fidelity can be improved by reducing errors accumulated with an increase in gate depth during quantum processing.

Meanwhile, the error mitigator may receive observed data in x-axis, y-axis, and z-axis from the quantum processing device, and may perform the error mitigation by using the observed data. Accordingly, by performing three-axis observation during quantum processing, information loss due to single-axis observation may be reduced.

Meanwhile, the error mitigator may be configured to: in response to three points in the observed data or vectors corresponding to the three points being located in a first region, output first data obtained by correcting the observed data; in response to the three points in the observed data or the vectors corresponding to the three points being located in a second region different from first region, output second data obtained by correcting the observed data; and in response to the three points in the observed data or the vectors corresponding to the three points being located in a third region different from second region, output third data obtained by correcting the observed data. Accordingly, errors occurring in the quantum domain may be reduced. Further, by performing three-axis observation during quantum processing, information loss due to single-axis observation may be reduced.

Meanwhile, in response to the quantum processing device outputting the observed data projected onto the x-axis, y-axis, and z-axis, the error mitigator may calculate three vector values on a Bloch Sphere based on the observed data, and may output data corrected based on the calculated three vector values. Accordingly, errors occurring in the quantum domain may be reduced. Further, by performing three-axis observation during quantum processing, information loss due to single-axis observation may be reduced.

Meanwhile, the computing device may further include an optimizer configured to feed back data, modified based on the data corrected by error mitigation by the error mitigator, to the quantum processing device. Accordingly, errors occurring in the quantum domain may be reduced.

Meanwhile, by performing a cost function-based minimization or maximization based on the corrected data, the optimizer may feed back the modified data to the quantum processing device. Accordingly, errors occurring in the quantum domain may be reduced.

Meanwhile, in response to the quantum processing device comprising parallel quantum processors, the error mitigator may receive data which are observed by the parallel quantum processors of the quantum processing device, and may perform error mitigation by using the observed data. Accordingly, errors occurring in the quantum domain may be reduced.

Meanwhile, the conversion device may perform gate conversion according to set gate depth for converting the data based on the first domain into the data based on the second domain. Accordingly, errors occurring in the quantum domain may be reduced. Further, fidelity can be improved by reducing errors accumulated with an increase in gate depth during quantum processing.

Meanwhile, the conversion device may include: a first axis converter configured to convert the data based on the first domain into the data based on the second domain in the x-axis; a second axis converter configured to convert the data based on the first domain into the data based on the second domain in the y-axis; and a third axis converter configured to convert the data based on the first domain into the data based on the second domain in the z-axis. Accordingly, errors occurring in the quantum domain may be reduced. Further, by performing three-axis observation during quantum processing, information loss due to single-axis observation may be reduced.

Meanwhile, the first interface may include: a first output device configured to output a first instruction queue based on the data based on the second domain in the x-axis which is received from the first axis converter; a second output device configured to output a second instruction queue based on the data based on the second domain in the y-axis which is received from the second axis converter; and a third output device configured to output a third instruction queue based on the data based on the second domain in the z-axis which is received from the third axis converter. Accordingly, errors occurring in the quantum domain may be reduced. Further, by performing three-axis observation during quantum processing, information loss due to single-axis observation may be reduced.

Meanwhile, a quantum computing system according to an embodiment of the present disclosure includes a computing device and a quantum processing device, wherein the computing device includes: a conversion device configured to convert data based on a first domain into data based on a second domain corresponding to a quantum domain; a first interface configured to output, to the quantum processing device, the data based on the second domain from the conversion device; a second interface configured to receive data processed by the quantum processing device; and an error mitigator configured to perform error mitigation on the data received from the second interface. Accordingly, errors occurring in the quantum domain may be reduced. Further, fidelity can be improved by reducing errors accumulated with an increase in gate depth during quantum processing.

Meanwhile, the quantum processing device may output observed data in x-axis, y-axis, and z-axis based on the data based on the second domain. Accordingly, errors occurring in the quantum domain may be reduced. Further, by performing three-axis observation during quantum processing, information loss due to single-axis observation may be reduced.

Meanwhile, the quantum processing device may include: a first quantum processor configured to output observed data in the x-axis based on the data based on the second domain; a second quantum processor configured to output observed data in the y-axis based on the data based on the second domain; and a third quantum processor configured to output observed data in the z-axis based on the data based on the second domain. Accordingly, errors occurring in the quantum domain may be reduced. Further, by performing three-axis observation during quantum processing, information loss due to single-axis observation may be reduced.

Meanwhile, the first quantum processor to the third quantum processor may operate in parallel independently of each other. Accordingly, errors occurring in the quantum domain may be reduced. Further, by performing three-axis observation during quantum processing, information loss due to single-axis observation may be reduced.

Meanwhile, the quantum processing device may include a quantum processor which, based on the data based on the second domain, is configured to output the observed data in the x-axis at a first time, to output the observed data in the y-axis at a second time after the first time, and to output the observed data in the z-axis at a third time after the second time. Accordingly, errors occurring in the quantum domain may be reduced. Further, by performing three-axis observation during quantum processing, information loss due to single-axis observation may be reduced.

Meanwhile, the first interface may include a parallel-serial output device configured to sequentially output a first instruction queue corresponding to the data based on the second domain in the x-axis, a second instruction queue corresponding to the data based on the second domain in the y-axis, and a third instruction queue corresponding to the data based on the second domain in the z-axis. Accordingly, errors occurring in the quantum domain may be reduced.

Further, by performing three-axis observation during quantum processing, information loss due to single-axis observation may be reduced.

Meanwhile, an operating temperature of the quantum processing device may be preferably lower than an operating temperature of the computing device. Accordingly, quantum processing may be performed stably.

Meanwhile, the operating temperature of the quantum processing device may be preferably −270° C. or less. Accordingly, quantum processing may be performed stably.

BRIEF DESCRIPTION OF THE DRAWINGS

FIG. 12 is a diagram referred to in the description of FIG. 11.

DETAILED DESCRIPTION OF THE PREFERRED EMBODIMENTS

Hereinafter, the present disclosure will be described in detail with reference to the accompanying drawings.

The suffixes "module" and "unit" for elements used in the following description are given simply in view of the ease of the description, and do not have a distinguishing meaning or role. Therefore, the suffixes "module" and "unit" may be used interchangeably.

Figure 1:
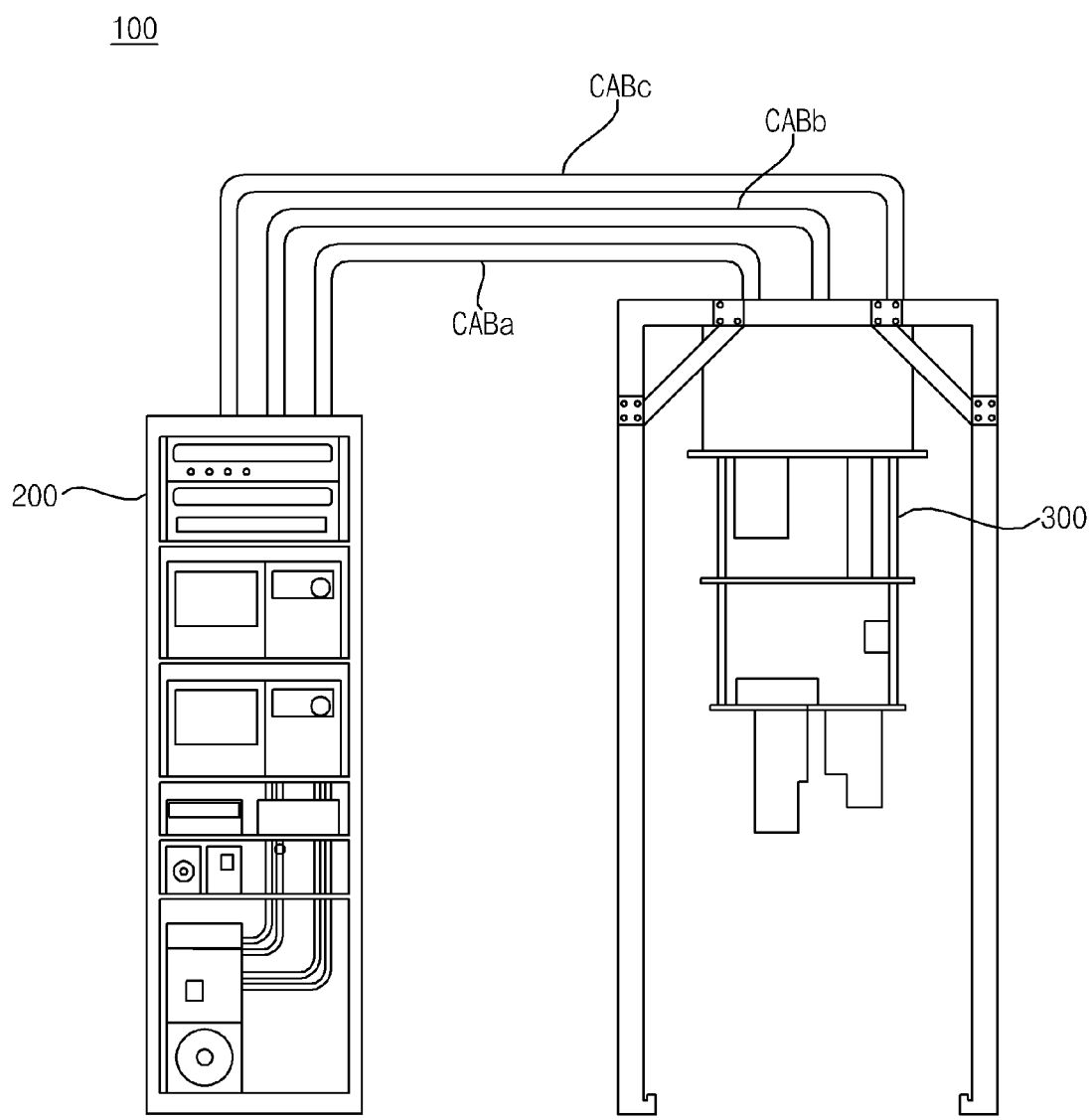
FIG. 1 is a diagram illustrating a quantum computing system according to an embodiment of the present disclosure.

FIG. 1 is a diagram illustrating a quantum computing system according to an embodiment of the present disclosure.

Referring to the drawing, a quantum computing system 100 according to an embodiment of the present disclosure includes a computing device 200 operating in a classical domain which is a first domain, and a quantum processing device 300 operating in a quantum domain which is a second domain.

Further, the quantum computing system 100 according to an embodiment of the present disclosure may further include cables CABa, CABb, and CABc for transmission of data or information between the computing device 200 and the quantum processing device 300.

Meanwhile, the computing device 200 according to an embodiment of the present disclosure may convert data in the first domain (hereinafter referred to as data based on the first domain) into data in the second domain which is the quantum domain (hereinafter referred to as data based on the second domain), may output the data based on the second domain to the quantum processing device 300, and may perform error mitigation on data processed by the quantum processing device 300. Accordingly, errors occurring in the quantum domain may be reduced. Further, fidelity can be improved by reducing errors accumulated with an increase in gate depth during quantum processing.

Meanwhile, the quantum processing device 300 according to an embodiment of the present disclosure may output observed data in the x-axis, observed data in the y-axis, and observed data in the z-axis, based on the data based on the second domain. As described above, three-axis observation is performed during the quantum processing, thereby reducing information loss due to single-axis observation. As a result, errors occurring in the quantum domain may be reduced.

Meanwhile, an operating temperature of the quantum processing device 300 is preferably lower than an operating temperature of the computing device 200. Accordingly, the quantum processing may be performed stably.

Meanwhile, the operating temperature of the quantum processing device 300 is preferably −270° C. or less. Accordingly, the quantum processing may be performed stably.

Figure 2A:
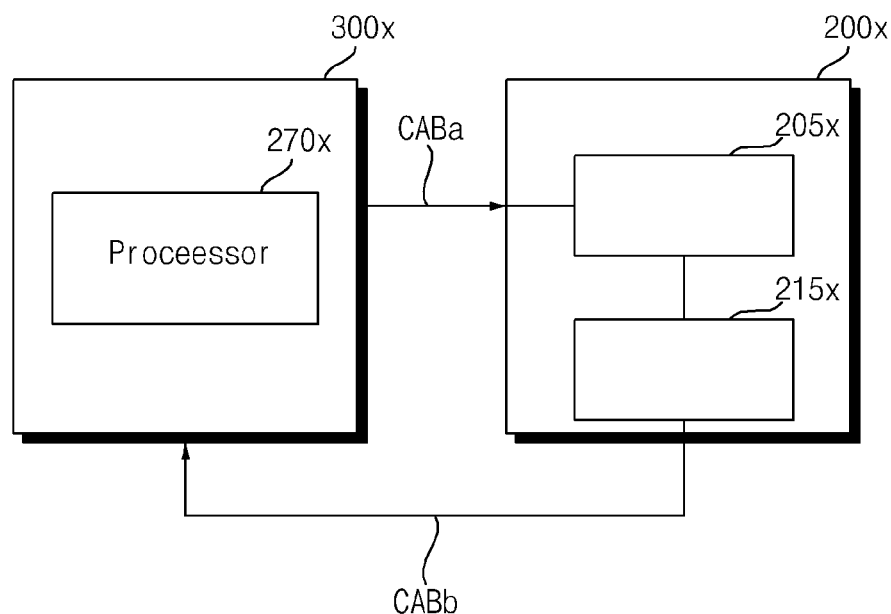
FIGS. 2A and 2B are diagrams referred to in the description of operation of a quantum computing system associated with the present disclosure.
Figure 2B:
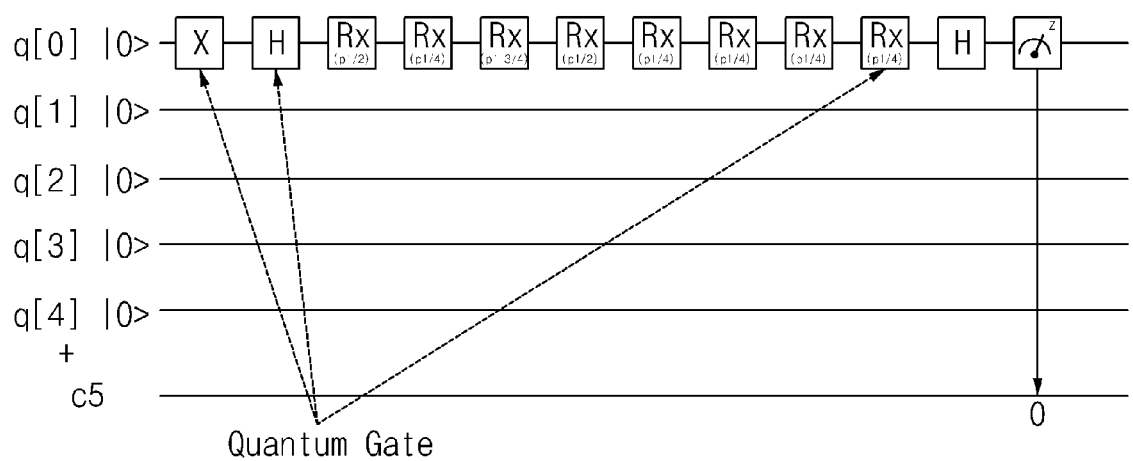

FIGS. 2A and 2B are diagrams referred to in the description of operation of a quantum computing system associated with the present disclosure.

First, FIG. 2A is a diagram illustrating a quantum computing system 100x corresponding to a prior art.

Referring to the drawing, the quantum computing system 100x may include a computing device 200x operating in a classical domain which is a first domain, and a quantum processing device 300x operating in a quantum domain which is a second domain.

In addition, the quantum computing system 100x corresponding to the prior art may further include cables CABa and CABb for transmission of data or information between the computing device 200x and the quantum processing device 300x.

The quantum processing device 300x corresponding to the prior art includes one quantum processor 270x configured to perform single-axis observation.

Further, the computing device 200x may include a calculation device 205x configured to perform calculation based on single-axis observed data which is observed by the quantum processing device 300x, and a feedback device 215x configured to feed back updated observed data.

The quantum computing system 100x of FIG. 2A uses a Hybrid Quantum-Classical (HQC) algorithm in Noise Intermediate-Scale Quantum (NISQ).

Meanwhile, in the case of using one quantum processor 270x, 1-qubit is in a superposition state and is represented by $|0\rangle \rightarrow 1/\sqrt{2}(\alpha|0\rangle+\beta|1\rangle))$ on the Hilbert Space. However, when this qubit is observed, the value may be observed on the z-axis, but the value on the x-axis or the y-axis is lost.

Accordingly, when the HQC algorithm used in the NISQ is applied, information transmission from the quantum domain to the classical domain is incomplete, and a considerable portion of information, particularly values projected onto the x-axis and y-axis, is lost.

In addition, in the quantum computing system 100x of FIG. 2A, an error mitigation algorithm is not applied such that errors occurring in the quantum domain may cause a problem.

FIG. 2B is a diagram illustrating a relationship between quantum gate depth and fidelity in the quantum computing system 100x of FIG. 2A.

Referring to the drawing, when the accuracy of one gate is 99. 9%, the accuracy of qubit after passing through 11 gates decreases by 1% to 98.9%.

That is, if the accuracy of one quantum gate is f, the accuracy after passing through n number of gates is deteriorated to $f^n$.

When the HQC algorithm is implemented, it is preferable that a gate depth increases in the quantum domain, but errors are accumulated as the gate depth increases, such that the accuracy of an algorithm implemented in the quantum domain is deteriorated, thus causing deterioration in the accuracy of the HQC algorithm.

Accordingly, the present disclosure proposes a method of improving fidelity by reducing errors occurring in the quantum domain, reducing information loss due to single-axis observation during quantum processing, and reducing errors accumulated with an increase in gate depth during quantum processing, which will be described below in further detail with reference to FIG. 3 and the following figures.

Figure 3:
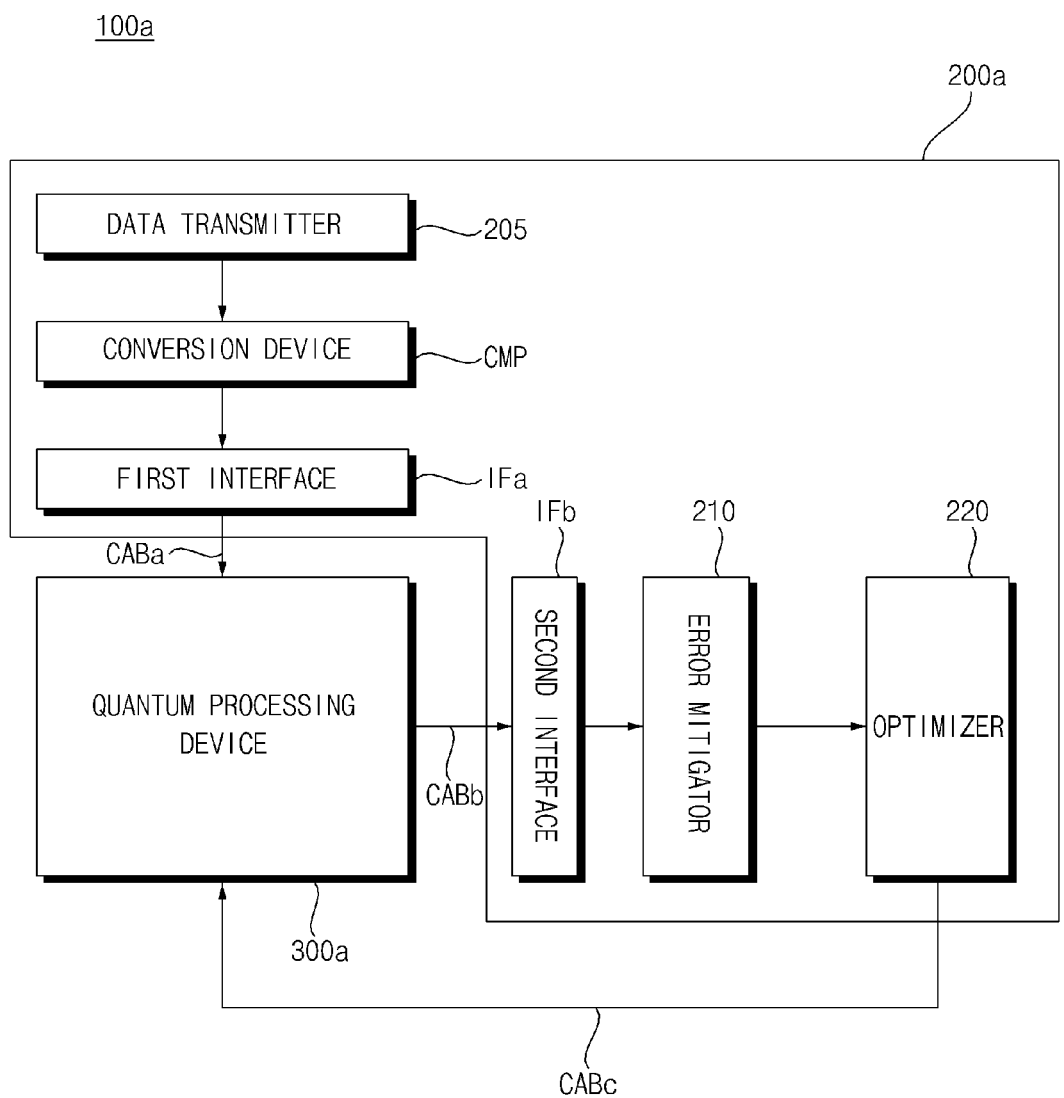
FIG. 3 is a diagram illustrating a computing device and a quantum computing system including the same, according to an embodiment of the present disclosure.

FIG. 3 is a diagram illustrating a computing device and a quantum computing system including the same, according to an embodiment of the present disclosure.

Referring to the drawing, a quantum computing system 100a according to an embodiment of the present disclosure may include a computing device 200a operating in a classical domain which is a first domain, and a quantum processing device 300a operating in a quantum domain which is a second domain.

The computing device 200a according to an embodiment of the present disclosure may include a transmitter 205 configured to transmit data based on the first domain, a conversion device CMP configured to convert the data based on the first domain into data in the second domain which is the quantum domain, a first interface IFa configured to output the data based on the second domain from the conversion device CMP to the quantum processing device 300a, a second interface IFb configured to receive data processed by the quantum processing device 300a, and an error mitigator 210 configured to perform error mitigation on the data received from the second interface IFb.

Accordingly, errors occurring in the quantum domain may be reduced. Further, fidelity can be improved by reducing errors accumulated with an increase in gate depth during quantum processing.

Meanwhile, the error mitigator 210 may receive observed data in x-axis, y-axis, and z-axis, and may perform error mitigation by using the observed data. Accordingly, by performing three-axis observation during quantum processing, information loss due to single-axis observation may be reduced.

Meanwhile, if three points in the observed data or vectors corresponding to the three points are located in a first region, the error mitigator 210 may output first data obtained by correcting the observed data; if the three points in the observed data or the vectors corresponding to the three points are located in a second region different from first region, the error mitigator 210 may output second data obtained by correcting the observed data; and if the three points in the observed data or the vectors corresponding to the three points are located in a third region different from second region, the error mitigator 210 may output third data obtained by correcting the observed data. Accordingly, errors occurring in the quantum domain may be reduced.

Further, by performing three-axis observation during quantum processing, information loss due to single-axis observation may be reduced.

Meanwhile, if the quantum processing device 300a outputs observed data projected onto the a-axis, y-axis, and z-axis, the error mitigator 210 may calculate three vector values on the Bloch Sphere based on the observed data, and may output data corrected based on the calculated three vector values. Accordingly, errors occurring in the quantum domain may be reduced. Further, by performing three-axis observation during quantum processing, information loss due to single-axis observation may be reduced.

Meanwhile, the computing device 200a according to an embodiment of the present disclosure may further include an optimizer 220 configured to feed back data, modified based on the data corrected by error mitigation by the error mitigator 210, to the quantum processing device 300a. Accordingly, errors occurring in the quantum domain may be reduced.

Meanwhile, the optimizer 220 may feed back the modified data to the quantum processing device 300a by performing a cost function-based minimization or maximization based on the corrected data. Accordingly, errors occurring in the quantum domain may be reduced.

Meanwhile, in the case where the quantum processing device 300a includes parallel quantum processors, the error mitigator 210 may receive observed data which are observed by parallel quantum processors 370a to 370c of the quantum processing device 300a and may perform error mitigation by using the observed data. Accordingly, errors occurring in the quantum domain may be reduced.

Meanwhile, in order to convert the data based on the first domain into the data based on the second domain, the conversion device CMP may perform gate conversion according to a set gate depth. Accordingly, errors occurring in the quantum domain may be reduced. Further, fidelity can be improved by reducing errors accumulated with an increase in gate depth during quantum processing.

Meanwhile, the quantum processing device 300a according to an embodiment of the present disclosure may output observed data in the x-axis, observed data in the y-axis, and observed data in the z-axis, based on the data based on the second domain. As described above, by performing three-axis observation during quantum processing, information loss due to single-axis observation may be reduced. As a result, errors occurring in the quantum domain may be reduced.

Meanwhile, an operating temperature of the quantum processing device 300a is preferably lower than an operating temperature of the computing device 200a. Accordingly, quantum processing may be performed stably.

Meanwhile, the operating temperature of the quantum processing device 300a is preferably −270° C. or less. Accordingly, quantum processing may be performed stably.

Meanwhile, the quantum computing system 100a according to an embodiment of the present disclosure may further include cables CABa, CABb, and CABc for transmission of data or information between the computing device 200a and the quantum processing device 300a.

The computing device 200a may transmit the data based on the second domain, converted by the conversion device CMP, to the quantum processing device 300a through a first cable CABa.

The quantum processing device 300a may transmit observed data, observed by the quantum processing device 300, to the computing device 200a through a second cable CABb.

The computing device 200a may transmit data, modified by the optimizer 220, to the quantum processing device 300 through a third cable CABc.

Figure 4:
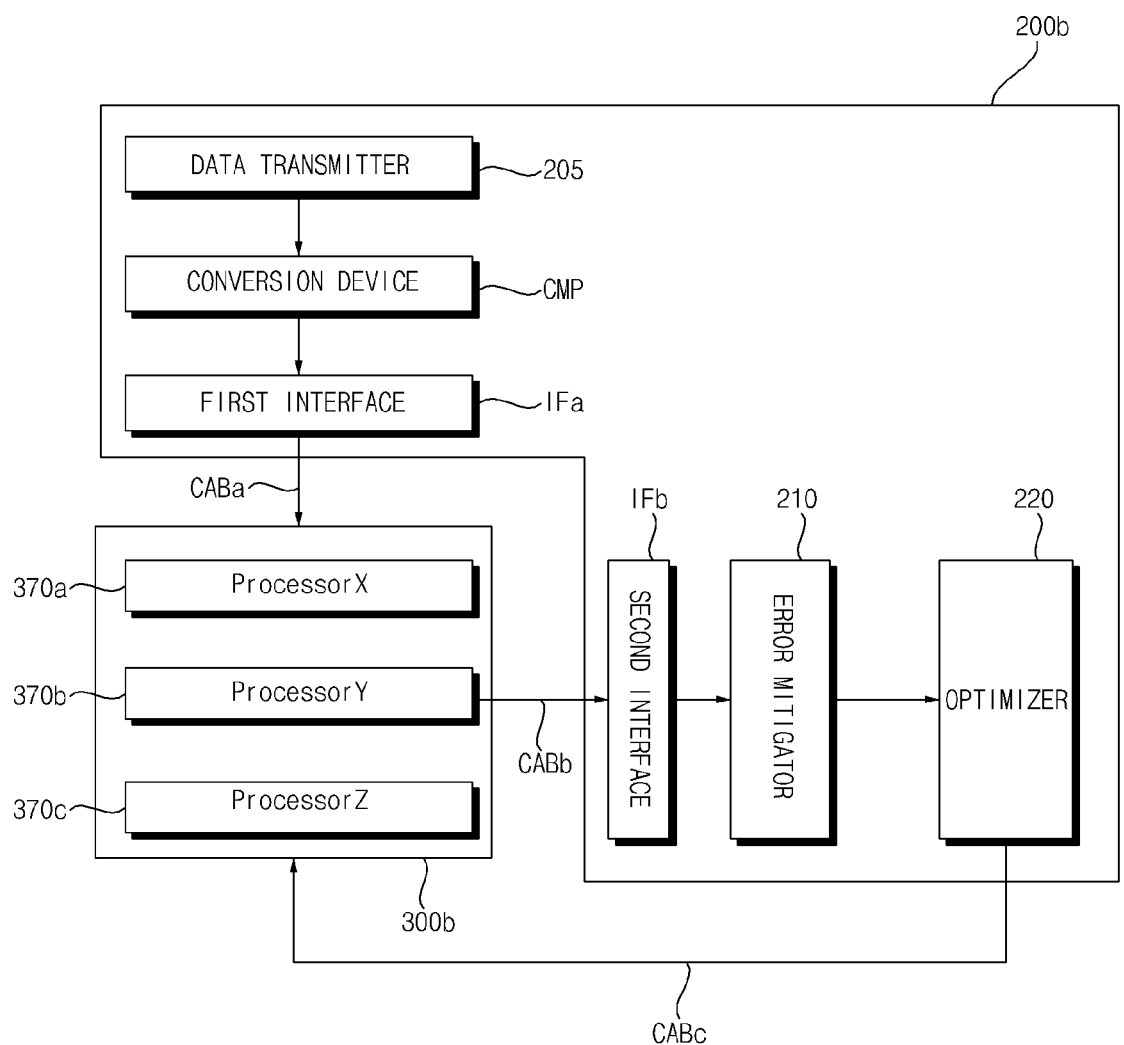
FIG. 4 is a diagram illustrating a computing device and a quantum computing system including the same, according to another embodiment of the present disclosure.

FIG. 4 is a diagram illustrating a computing device and a quantum computing system including the same, according to another embodiment of the present disclosure.

Referring to the drawing, a quantum computing system 100b according to another embodiment of the present disclosure may include a computing device 200b operating in a classical domain which is a first domain, and a quantum processing device 300b operating in a quantum domain which is a second domain.

In addition, the quantum computing system 100b according to an embodiment of the present disclosure may further include cables CABa, CABb, and CABc for transmission of data or information between the computing device 200b and the quantum processing device 300b.

Meanwhile, the quantum computing system 100b of FIG. 4 is similar to the quantum computing system 100a of FIG. 3, with a difference being that three quantum processors 370a to 370c are provided in the quantum processing device 300b.

Accordingly, the computing device 200b in the quantum computing system 100b may operate in the same manner as the computing device 200a in the quantum computing system 100a of FIG. 3, such that a description thereof will be omitted.

Meanwhile, the quantum processing device 300b may include a first quantum processor 370a configured to output observed data in the x-axis based on the data based on the second domain, a second quantum processor 370b configured to output observed data in the y-axis based on the data based on the second domain, and a third quantum processor 370c configured to output observed data in the z-axis based on the data based on the second domain. Accordingly, errors occurring in the quantum domain may be reduced. Further, by performing three-axis observation during quantum processing, information loss due to single-axis observation may be reduced.

Meanwhile, the first quantum processor 370a to the third quantum processor 370c may operate in parallel independently of each other. Accordingly, errors occurring in the quantum domain may be reduced. Further, by performing three-axis observation during quantum processing, information loss due to single-axis observation may be reduced.

Figure 5:
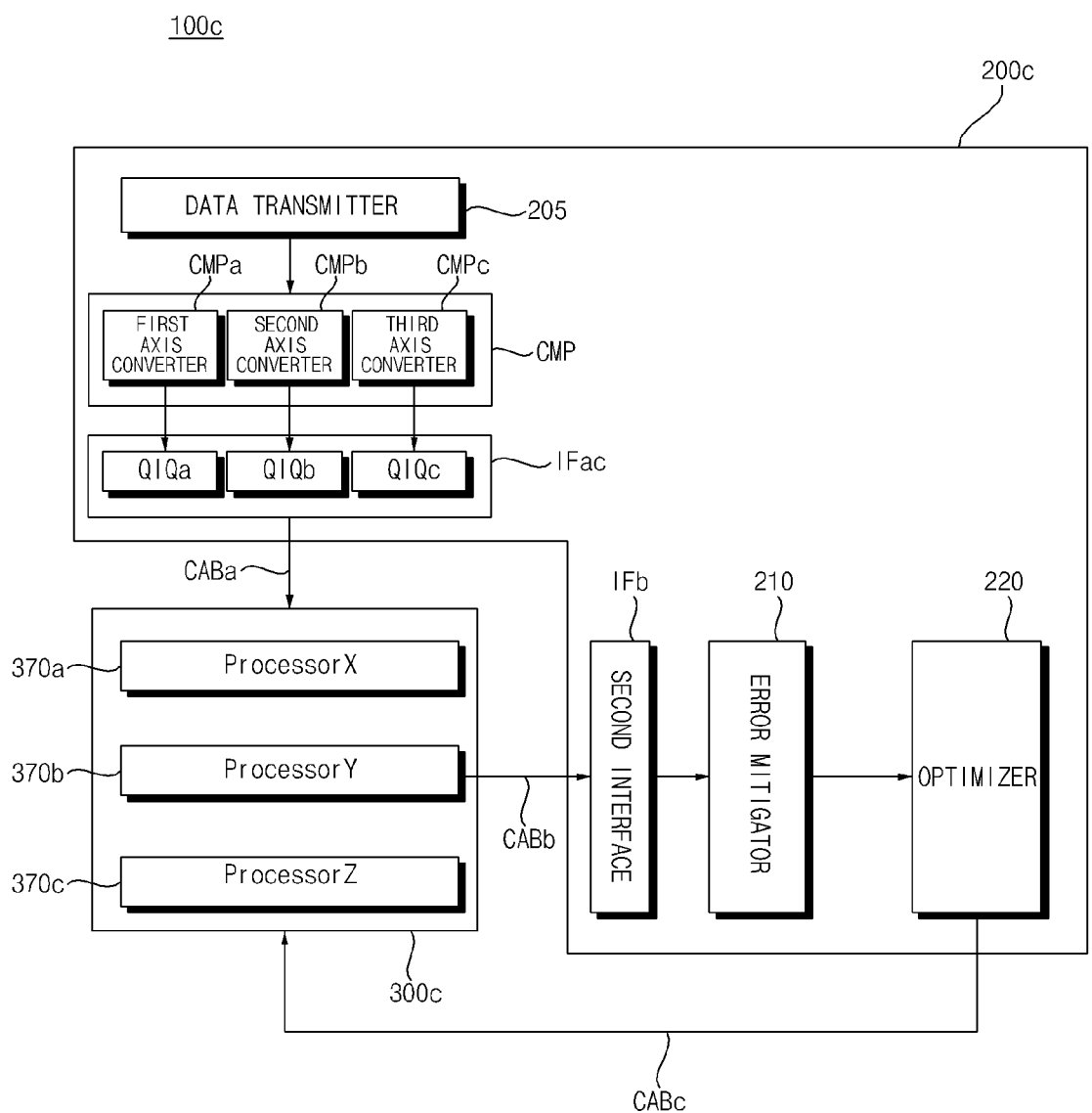
FIG. 5 is a diagram illustrating a computing device and a quantum computing system including the same, according to yet another embodiment of the present disclosure.

FIG. 5 is a diagram illustrating a computing device and a quantum computing system including the same, according to yet another embodiment of the present disclosure.

Referring to the drawing, a quantum computing system 100c according to yet another embodiment of the present disclosure may include a computing device 200c operating in a classical domain which is a first domain, and a quantum processing device 300c operating in a quantum domain which is a second domain.

In addition, the quantum computing system 100c according to an embodiment of the present disclosure may further include cables CABa, CABb, and CABc for transmission of data or information between the computing device 200c and the quantum processing device 300c.

Meanwhile, the quantum computing system 100c of FIG. 5 is similar to the quantum computing system 100b of FIG. 4, with a difference being that the conversion device CMP in the computing device 200c includes three converters and the first interface IFa includes three output devices.

Meanwhile, three quantum processors 370a to 370c are provided in the quantum processing device 300c, and the operation of the quantum processing device 300c is described above with reference to FIG. 4, such that a description thereof will be omitted.

In addition, the transmitter 205, the second interface IFb, the error mitigator 210, and the optimizer 220 in the computing device 200c may operate in the same manner as the computing device 200a in the quantum computing system 100a of FIG. 3, such that a description thereof will be omitted.

Meanwhile, the conversion device CMP may include a first axis converter CMPa configured to convert the data based on the first domain into the data based on the second domain in the x-axis, a second axis converter CMPb configured to convert the data based on the first domain into the data based on the second domain in the y-axis, and a third axis converter CMPc configured to convert the data based on the first domain into the data based on the second domain in the z-axis. Accordingly, errors occurring in the quantum domain may be reduced. Further, by performing three-axis observation during quantum processing, information loss due to single-axis observation may be reduced.

Meanwhile, the first interface IFa may include a first output device QIQa configured to output a first instruction queue based on the data based on the second domain in the x-axis which is received from the first axis converter CMPa, a second output device QIQb configured to output a second instruction queue based on the data based on the second domain in the y-axis which is received from the second axis converter CMPb, and a third output device QIQc configured to output a third instruction queue based on the data based on the second domain in the z-axis which is received from the third axis converter CMPc. Accordingly, errors occurring in the quantum domain may be reduced. Further, by performing three-axis observation during quantum processing, information loss due to single-axis observation may be reduced.

Figure 6:
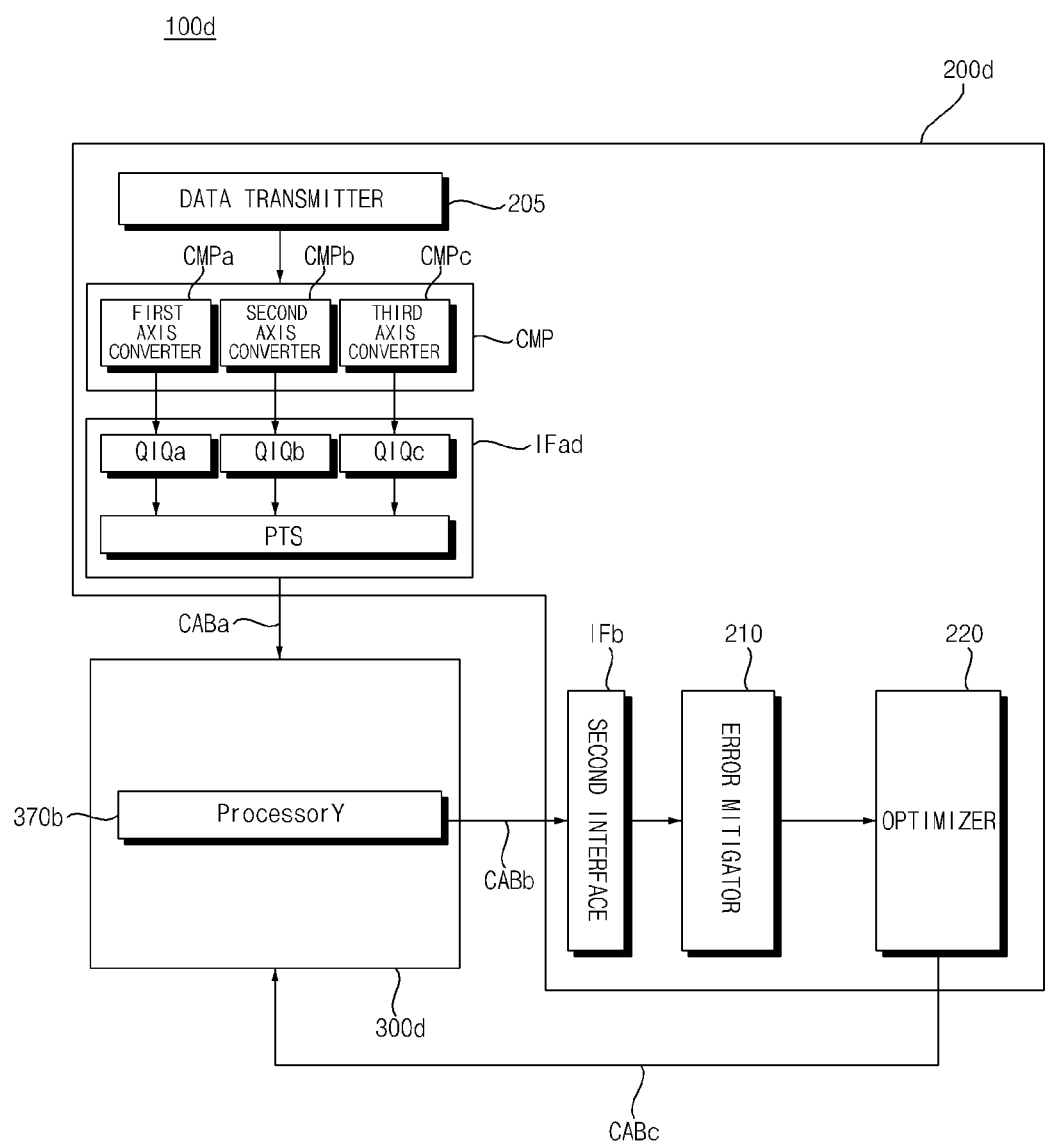
FIG. 6 is a diagram illustrating a computing device and a quantum computing system including the same, according to yet another embodiment of the present disclosure.

FIG. 6 is a diagram illustrating a computing device and a quantum computing system including the same, according to yet another embodiment of the present disclosure.

Referring to the drawing, a quantum computing system 100d according to yet another embodiment of the present disclosure may include a computing device 200d operating in a classical domain which is a first domain, and a quantum processing device 300d operating in a quantum domain which is a second domain.

In addition, the quantum computing system 100d according to an embodiment of the present disclosure may further include cables CABa, CABb, and CABc for transmission of data or information between the computing device 200d and the quantum processing device 300d.

Meanwhile, the quantum computing system 100d of FIG. 6 is similar to the quantum computing system 100c of FIG. 5 in that the conversion device CMP in the computing device 200c includes three converters and the first interface IFa includes three output devices.

However, there is a difference in that the quantum processing device 300d in the quantum computing system 100d of FIG. 6 includes one quantum processor, rather than the three quantum processors 370a to 370c.

However, the quantum processing device 300d in the quantum computing system 100d may include a quantum processor 370b which, based on the data based on the second domain, is configured to output observed data in the x-axis at a first time, to output observed data in the y-axis at a second time after the first time, and to output observed data in the z-axis at a third time after the second time. Accordingly, errors occurring in the quantum domain may be reduced. Further, by performing three-axis observation during quantum processing, information loss due to single-axis observation may be reduced.

Meanwhile, the first interface IFa may further include a parallel-serial output device PTS configured to sequentially output the first instruction queue corresponding to the data based on the second domain in the x-axis, the second instruction queue corresponding to the data based on the second domain in the y-axis, and the third instruction queue corresponding to the data based on the second domain in the z-axis.

That is, the parallel-serial output device PTS may sequentially and serially output data that are input in parallel.

Accordingly, errors occurring in the quantum domain may be reduced. Further, by performing three-axis observation during quantum processing, information loss due to single-axis observation may be reduced.

FIGS. 7 to 10C are diagrams referred to in the description of FIGS. 3 to 6.

Figure 7:
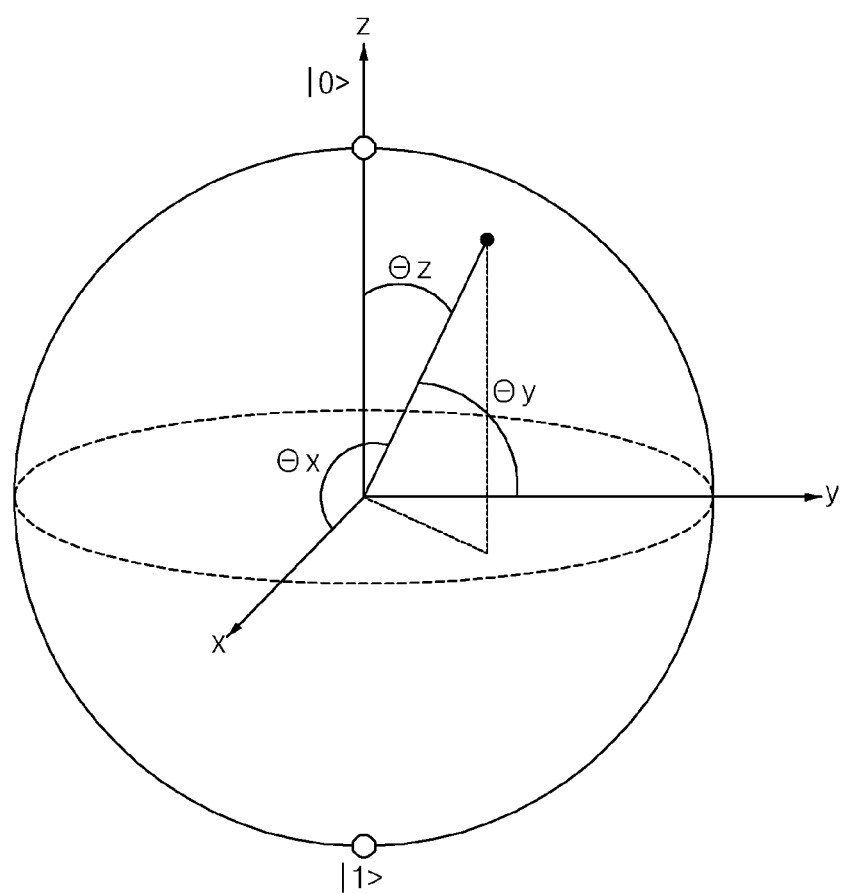
FIGS. 7 to 10C are diagrams referred to in the description of FIGS. 3 to 6.

First, FIG. 7 illustrates an example of the Bloch sphere for quantum computing.

Referring to the drawing, a black point in the drawing may have coordinates along the x-axis, y-axis, and z-axis, and values θx, θy, and θz corresponding to the point may be obtained.

Meanwhile, the conversion device CMP may compile or convert gates.

The gates may include X, Y, Z gates, Pauli gates Rx, Ry, and Rz, and the like.

In this case, the gates Rx, Ry, and Rz may be defined as follows:
Rx (a): rotation of A degrees about the x-axis in a counterclockwise direction;
Ry (a): rotation of A degrees about the y-axis in a counterclockwise direction; and
Rz (a): rotation of A degrees about the z-axis in a counterclockwise direction.

Meanwhile, when operations of the gates Rx, Ry, and Rz are defined as above, gate conversion may be performed as follows.

As for Rx,z (a)→Rz,x (a), Rx,z (a)→Ry,y (a), the gate Rx on the z-axis may be converted into the gates Rz and Ry on the x-axis, as for Ry,z (a)→Rx,x (a), Ry,z (a)→Rz,y (a), the gate Ry on the z-axis may be converted into the gates Rx and Rz on the x-axis, and as for Rz,z (a)→Ry,x (a), Rz,z (a)→Rx,y (a), the gate Rz on the z-axis may be converted into the gates Ry and Rx on the x-axis.

The conversion device CMP in the computing device 200 may convert a given algorithm into a quantum assembly language (QASM), and the first interface IFa in the computing device 200 may output a command queue for sequentially executing quantum gate commands converted into the QASM.

Meanwhile, the quantum processing device 300 according to an embodiment of the present disclosure may output observed data in the x-axis, y-axis, and z-axis, in which case the observed data in the x-axis, y-axis, and z-axis may be values θx, θy, and θz.

Meanwhile, the parallel quantum processors 370a to 370c in the quantum processing device 300 may execute commands in the queue to output observed data θx, θy, and θz.

Then, the error mitigator 210 in the computing device 200 may mitigate errors by using the observed data θx, θy, and θz. Accordingly, errors occurring in the quantum domain may be reduced. In addition, fidelity can be improved by reducing errors accumulated with an increase in gate depth during quantum processing.

Meanwhile, the error mitigator 210 may execute an error mitigation algorithm by using the observed data θx, θy, and θz, and may output data corrected by the error mitigation algorithm.

In this case, the corrected data may be $\hat{\theta}_x$ $\hat{\theta}_y$ $\hat{\theta}_z$.

Then, the optimizer 220 may feed back modified data to the quantum processing device 300 by performing a cost function-based minimization or maximization based on the corrected data. In this case, the fed-back data may be $\breve{\Theta}_x$ $\breve{\Theta}_y$ $\breve{\Theta}_z$.

As described above, the fed-back data is received to the quantum processing device 300 for use in state preparation of qubits in a quantum algorithm.

Figure 8A:
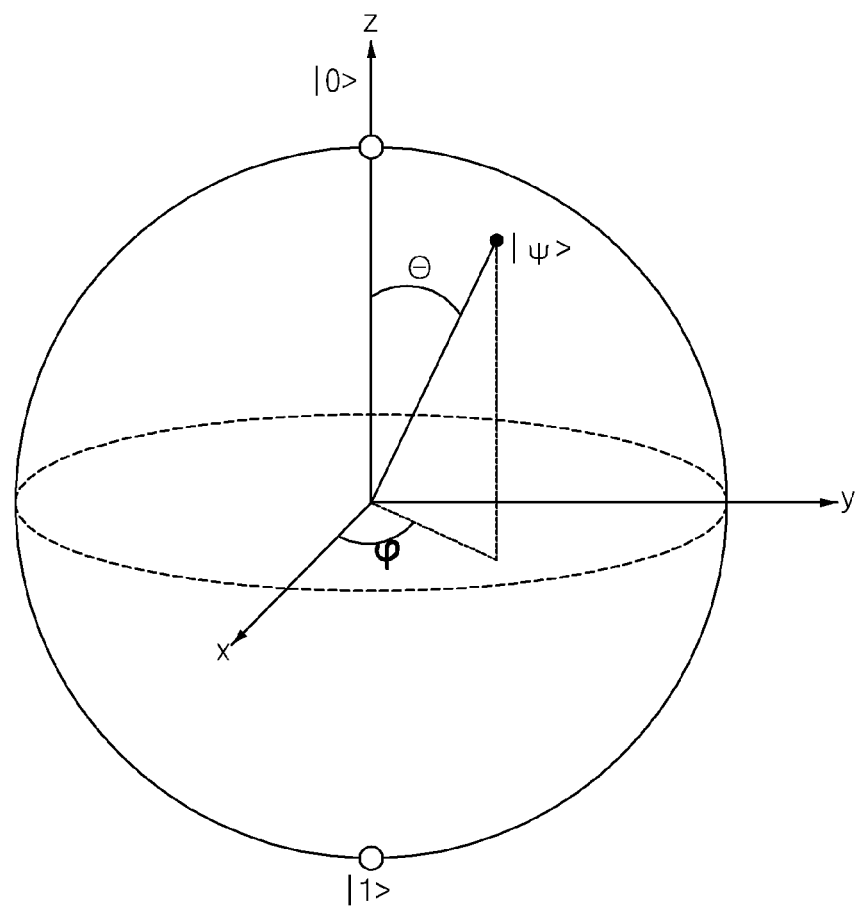
Figure 8B:
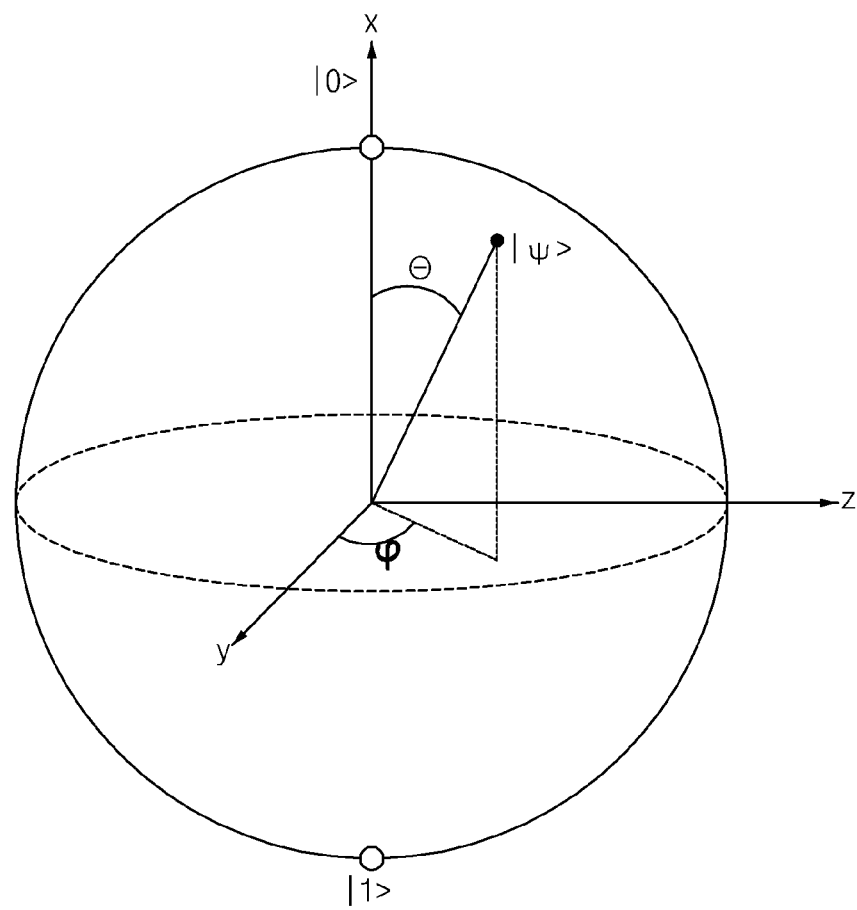
Figure 8C:
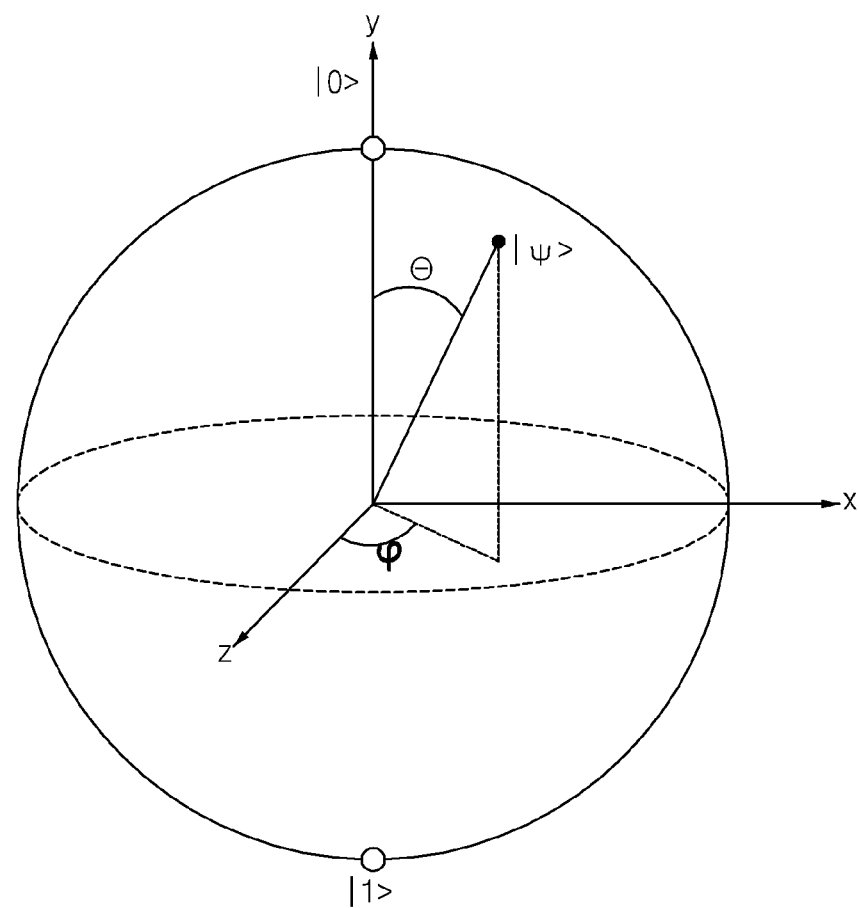

FIGS. 8A to 8C are diagrams illustrating various example of the Bloch sphere.

Referring to FIG. 8A, zz may be observed or measured among xz, yz, and zz.

Referring to FIG. 8B, zx may be observed or measured among xx, yx, and zx.

Referring to FIG. 8C, zy may be observed or measured among xy, yy, and zy.

Meanwhile, the error mitigator 210 may calculate {xz,yz,zz}, {xx,yx,zx}, and {xy,yy,zy} while increasing Δφ in a range of 0≤φ$_x$ φ$_y$ φ$_z$<2π by using Cartesian coordinate transformation equations illustrated in FIGS. 8A to 8C.

Specifically, the error mitigator 210 may calculate {xz, yz,zz} based on the equation of FIG. 8A, may calculate {xx,yx,zx} based on the equation of FIG. 8B, and may calculate {xy,yy,zy} based on the equation of FIG. 8C.

Figure 9A:
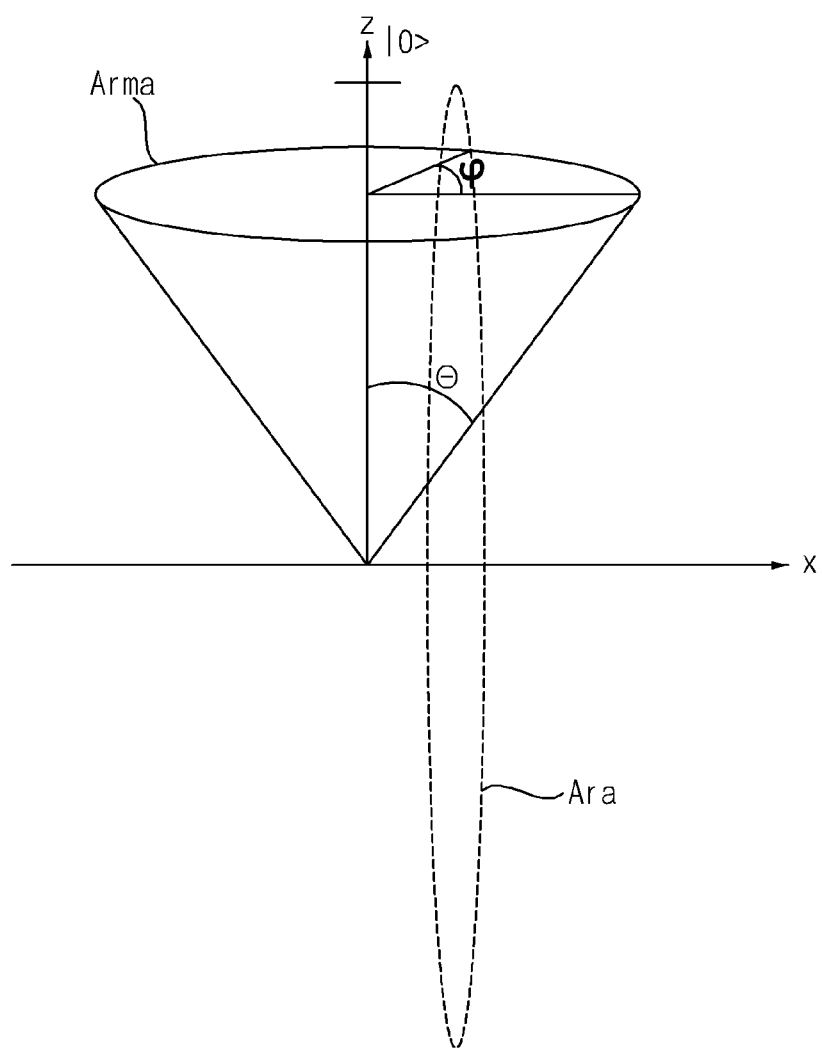

Meanwhile, FIG. 9A illustrates an example in which a first circle Arma rotating about the z-axis and a second circle Ara rotating about the x-axis intersect at two points on the Bloch sphere.

Figure 9B:
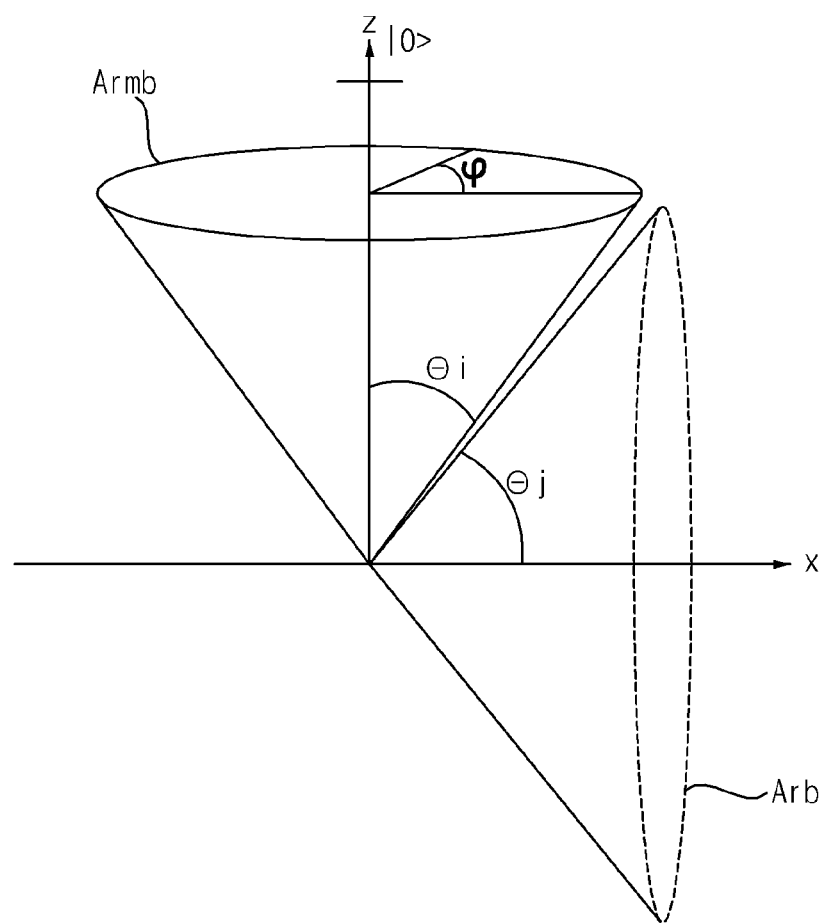

FIG. 9B illustrates an example in which a first circle Armb rotating about the z-axis and a second circle Arb rotating about the x-axis do not intersect with each other on the Bloch sphere.

Meanwhile, the error mitigator 210 may calculate the following Equation 1 based on {xz,yz,zz}, {xx,yx,zx}, and {xy,yy,zy}.

$$\min\{d_{x,y}\} = \min\{(x_x - x_y)^2 + (y_x - y_y)^2 + (z_x - z_y)^2\} \quad \text{[Equation 1]}$$
$$\min\{d_{y,z}\} = \min\{(x_y - x_z)^2 + (y_y - y_z)^2 + (z_y - z_z)^2\}$$
$$\min\{d_{z,x}\} = \min\{(x_z - x_x)^2 + (y_z - y_x)^2 + (z_z - z_x)^2\}$$

A solution that satisfies one or two minimum distances according to positions θi and θj of FIG. 9B may be obtained using a vector satisfying a minimum value of the above Equation 1.

Meanwhile, the error mitigator 210 may locate where the solution lies in the eight quadrants of the Bloch sphere based on the values θx, θy, and θz, and may finally calculate three vector values in the following Equation 2.

$$\vec{r}_z = (x_{z\_min}, y_{z\_min}, z_{z\_min}) \quad \text{[Equation 2]}$$
$$\vec{r}_z = (x_{x\_min}, y_{x\_min}, z_{x\_min})$$
$$\vec{r}_z = (x_{y\_min}, y_{y\_min}, z_{y\_min})$$

Meanwhile, the calculated three vector values $\vec{r}_x$, $\vec{r}_y$, $\vec{r}_z$ may be classified into three cases.

A first case will be described with reference to FIG. 10A, a second case will be described with reference to FIG. 10B, and a third case will be described with reference to FIG. 10C.

Figure 10A:
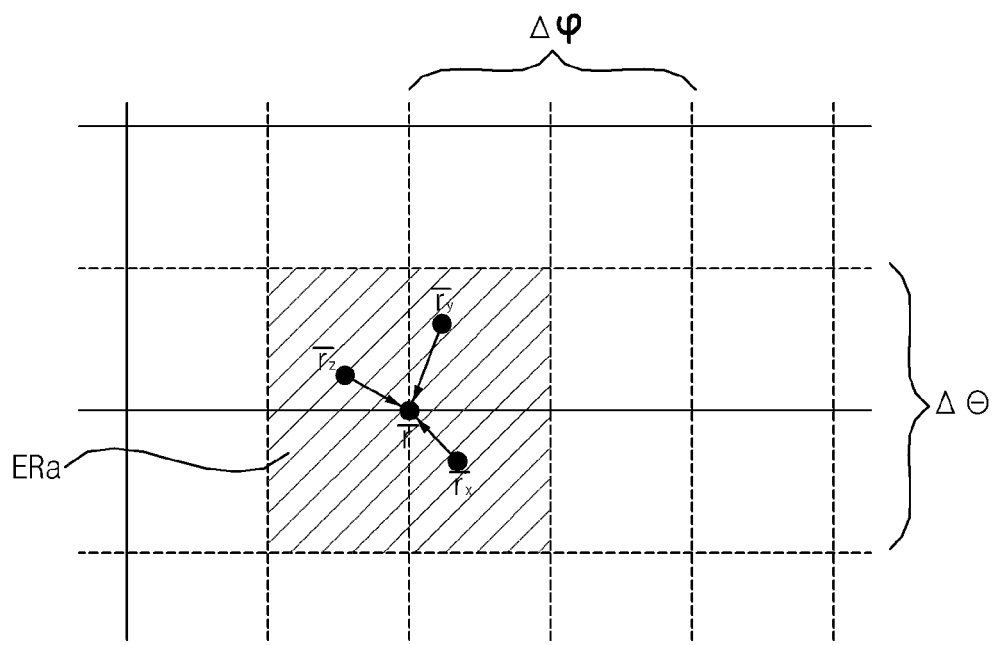

FIG. 10A is a diagram illustrating an example in which three points on the Bloch sphere or vectors corresponding to the three points are located in a first region ERa.

Referring to the drawing, in the case where three points on the Bloch sphere or vectors $\vec{r}_x$, $\vec{r}_y$, $\vec{r}_z$ corresponding to the three points are located within the first region ERa from a reference point, i.e., are located within $$\pm \frac{\Delta\theta}{2} \text{ and } \pm \frac{\Delta\varphi}{2}$$

from the reference point, the error mitigator 210 may output values $\hat{\theta}_x$ $\hat{\theta}_y$ $\hat{\theta}_z$ corrected based on the reference point $\vec{r}$.

Figure 10B:
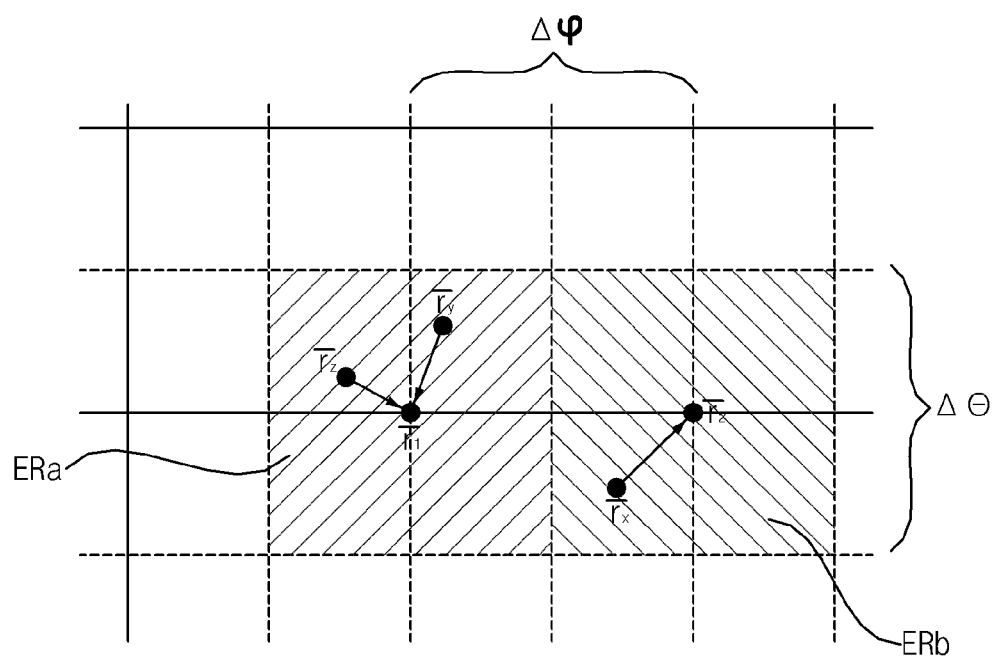

FIG. 10B is a diagram illustrating an example in which three points on the Bloch sphere or vectors corresponding to the three points are located in a second region ERb.

Referring to the drawing, in the case where three points on the Bloch sphere or vectors $\vec{r}_x$, $\vec{r}_y$, $\vec{r}_z$ corresponding to the three points are located within the second region from a reference point, the error mitigator 210 may output values $\hat{\theta}_x$ $\hat{\theta}_y$ $\hat{\theta}_z$ corrected based on the reference point $\vec{r}_1$.

Figure 10C:
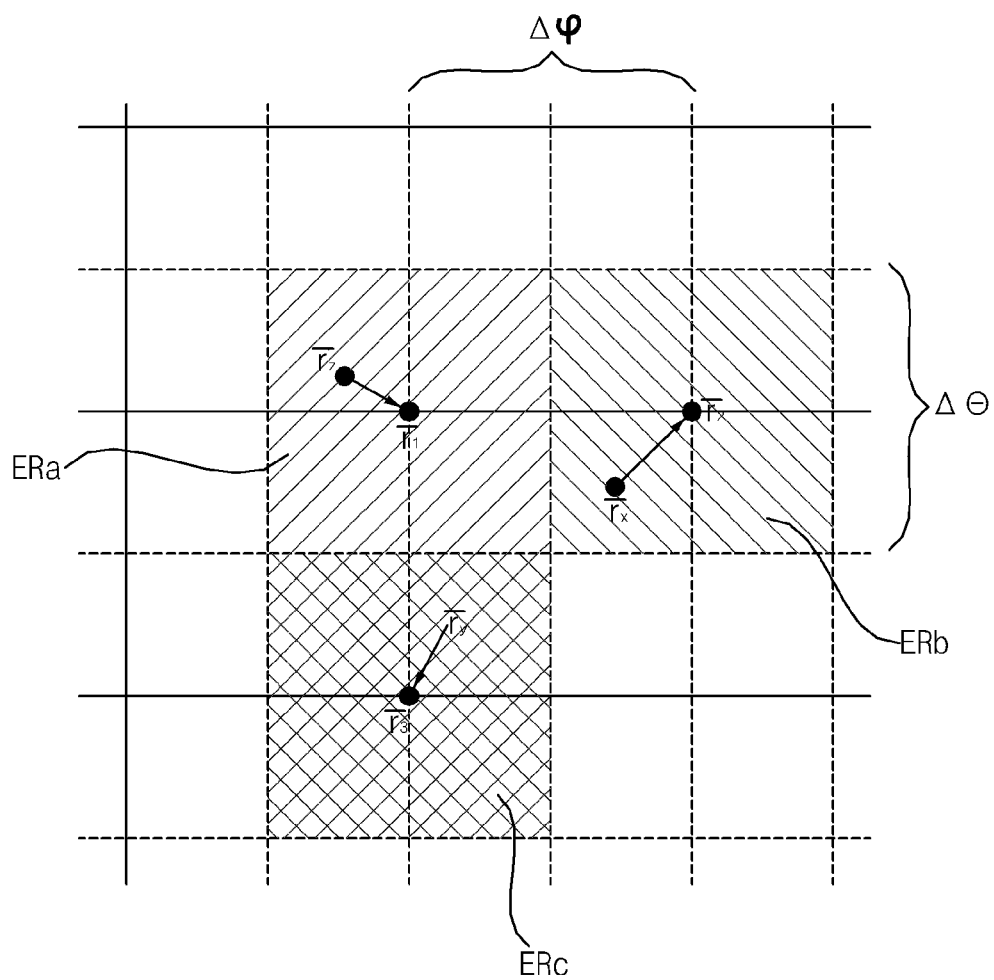

FIG. 10C is a diagram illustrating an example in which three points on the Bloch sphere or vectors corresponding to the three points are located in a third region ERc.

Referring to the drawing, in the case where three points on the Bloch sphere or vectors $\vec{r}_x$, $\vec{r}_y$, $\vec{r}_z$ corresponding to the three points are located within the third 514 region ERc from a reference point, and are ¼π<θ$_z$<⅝π and ¼π<θ$_y$<⅝π, the error mitigator 210 may output data $\hat{\theta}_x$ $\hat{\theta}_y$ $\hat{\theta}_z$ corrected based on the reference point $\vec{r}_1$.

Meanwhile, in the case where three points on the Bloch sphere or vectors $\vec{r}_x$, $\vec{r}_y$, $\vec{r}_z$ corresponding to the three points are located within the third region ERc from the reference point, and are $$\frac{1}{4}\pi < \theta_z < \frac{5}{4}\pi \text{ and } \frac{1}{4}\pi < \theta_x < \frac{5}{4}\pi,$$

the error mitigator 210 may output data $\hat{\theta}_x$ $\hat{\theta}_y$ $\hat{\theta}_z$ corrected based on the reference point $\vec{r}_3$.

Meanwhile, in the case where three points on the Bloch sphere or vectors $\vec{r}_x$, $\vec{r}_y$, $\vec{r}_z$ corresponding to the three points are located within the third region ERc the error from the reference point, and $$\frac{1}{4}\pi < \theta_y < \frac{5}{4}\pi \text{ and } \frac{1}{4}\pi < \theta_x < \frac{5}{4}\pi,$$

are the error mitigator 210 may output data $\hat{\theta}_x$ $\hat{\theta}_y$ $\hat{\theta}_z$ corrected based on the reference point $\vec{r}_1$.

As described above, the error mitigator 210 may mitigate or reduce errors in the quantum domain by outputting the corrected data $\hat{\theta}_x$ $\hat{\theta}_y$ $\hat{\theta}_z$.

Figure 11:
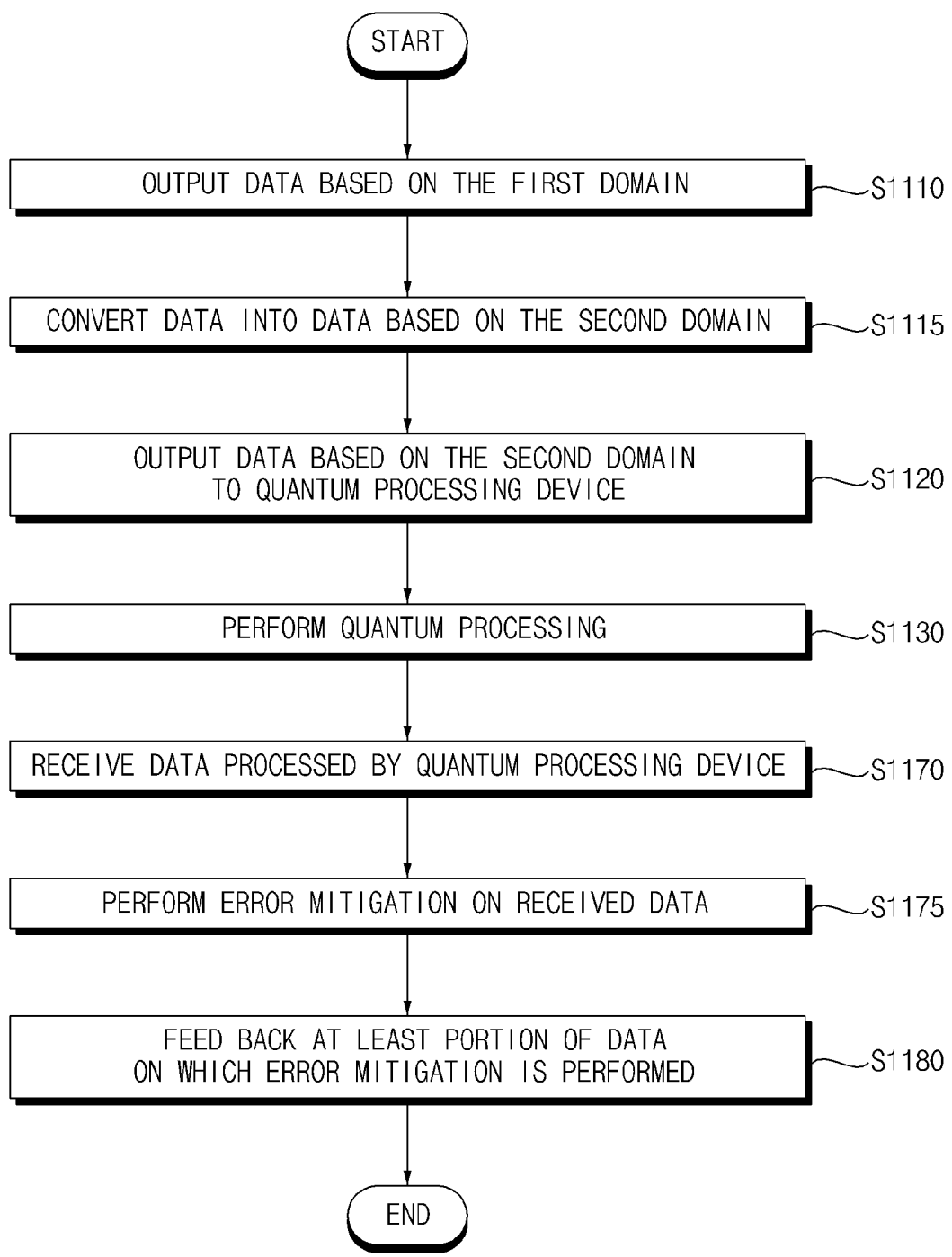
FIG. 11 is a flowchart illustrating a method of operating a quantum computing system according to an embodiment of the present disclosure.

FIG. 11 is a flowchart illustrating a method of operating a quantum computing system according to an embodiment of the present disclosure, and FIG. 12 is a diagram referred to in the description of FIG. 11.

First, referring to FIG. 11, the transmitter 205 in the computing device 200 according to an embodiment of the present disclosure may output data based on the first domain (S1110).

Then, the conversion device CMP in the computing device 200 according to an embodiment of the present disclosure may convert the data based on the first domain into the data based on the second domain, the second domain being the quantum domain (S1115).

The conversion device CMP may include three compilers or three axis converters.

For example, the conversion device CMP may include the first axis converter CMPa configured to convert the data based on the first domain into the data based on the second domain in the x-axis, the second axis converter CMPb configured to convert the data based on the first domain into the data based on the second domain in the y-axis, and the third axis converter CMPc configured to convert the data based on the first domain into the data based on the second domain in the z-axis.

The conversion device CMP in the computing device 200 may convert a given algorithm into the quantum assembly language (QASM).

Then, the first interface IFa in the computing device 200 according to an embodiment of the present disclosure may output the data based on the second domain to the quantum processing device 300 (S1120).

The first interface IFa in the computing device 200 may output a command queue for sequentially executing quantum gate commands converted into the QASM.

Subsequently, the quantum processing device 300 according to an embodiment of the present disclosure may perform quantum processing.

For example, as illustrated in FIGS. 4 and 5, the quantum processing device 300 includes the parallel quantum processors 370a to 370c and may output observed data θx, θy, and θz which are observed by the parallel quantum processors 370a to 370c.

In another example, as illustrated in FIG. 6, the quantum processing device 300 includes one quantum processor 370b and may output the observed data θx, θy, and θz which are observed based on data sequentially input by the parallel-serial output device PTS.

Then, the second interface IFb in the computing device 200 according to an embodiment of the present disclosure may receive data processed by the quantum processing device 300 (S1120).

For example, the second interface IFb may receive the observed data θx, θy, and θz from the quantum processing device 300.

Next, the error mitigator 210 in the computing device 200 according to an embodiment of the present disclosure perform error mitigation on the data received from the second interface IFb (S1175).

For example, the error mitigator 210 may calculate {xz, yz,zz}, {xx,yx,zx}, and {xy,yy,zy} by using Cartesian coordinate transformation equations illustrated in FIGS. 8A to 8C.

Then, the error mitigator 210 may calculate min {dx,y}, min {dy,z}, min {dz,x} of the above Equation 1 based on {xz,yz,zz}, {xx,yx,zx}, and {xy,yy,zy}.

Further, the error mitigator 210 may calculate three vector values of Equation 2 based on min {dx,y}, min {dy,z}, min {dz,x}.

In addition, the error mitigator 210 may perform correction by classifying the three vector values into three cases and may output corrected data $\hat{\theta}_x\ \hat{\theta}_y\ \hat{\theta}_z$.

The correction based on the three cases will be described later with reference to FIG. 12.

Then, the optimizer 220 in the computing device 200 according to an embodiment of the present disclosure may feed back data, modified based on the data corrected by error mitigation by the error mitigator 210, to the quantum processing device 300 (S1180).

In this case, the fed-back data may be $\check{\Theta}_x\ \check{\Theta}_y\ \check{\Theta}_z$.

As described above, the fed-back data is received to the quantum processing device 300 for use in state preparation of qubits in a quantum algorithm.

FIG. 12 is a flowchart illustrating a correction method performed by the error mitigator 210 based on three cases.

Referring to the drawing, the error mitigator 210 determines whether three points based on three vector values are located in a first region (S1235), and if there are three points, the error mitigator 210 may output corrected first data (S1240).

As illustrated in FIG. 10A, if three points based on three vector values are located in the first region ERa, the error mitigator 210 may output data $\hat{\theta}_x\ \hat{\theta}_y\ \hat{\theta}_z$ corrected based on the reference point $\vec{r}$.

Then, the error mitigator 210 determines whether three points based on three vector values are located in a second region (S1245), and if there are three points, the error mitigator 210 may output corrected second data (S1250).

As illustrated in FIG. 10B, if three points based on three vector values are located in the second region ERb, the error mitigator 210 may output data $\hat{\theta}_x\ \hat{\theta}_y\ \hat{\theta}_z$ corrected based on the reference point $r_1$.

Subsequently, the error mitigator 210 determines whether three points based on three vector values are located in a third region (S1255), and if there are three points, the error mitigator 210 may output corrected third data (S1260).

As illustrated in FIG. 10C, if three points based on three vector values are located in the third region ERc, the error mitigator 210 may output data $\hat{\theta}_x\ \hat{\theta}_y\ \hat{\theta}_z$ corrected based on the reference point $\vec{r}_1$ or $\vec{r}_3$.

As described above, the error mitigator 210 may mitigate or reduce errors in the quantum domain by outputting the corrected data 10 $\hat{\theta}_x\ \hat{\theta}_y\ \hat{\theta}_z$. In addition, fidelity can be improved by reducing errors accumulated with an increase in gate depth during quantum processing. Further, by performing three-axis observation during quantum processing, information loss due to single-axis observation may be reduced.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A computing device comprising:
   a conversion device configured to convert data based on a first domain into data based on a second domain corresponding to a quantum domain;
   a first interface configured to output the data based on the second domain from the conversion device to a quantum processing device;

a second interface configured to receive data processed by the quantum processing device; and an error mitigator configured to perform error mitigation on the data received from the second interface.

2. The computing device of claim 1, wherein the error mitigator receives observed data in x-axis, y-axis, and z-axis from the quantum processing device, and performs the error mitigation by using the observed data.

3. The computing device of claim 1, wherein the error mitigator is configured to:
   in response to three points in the observed data or vectors corresponding to the three points being located in a first region, output first data obtained by correcting the observed data;
   in response to the three points in the observed data or the vectors corresponding to the three points being located in a second region different from first region, output second data obtained by correcting the observed data; and
   in response to the three points in the observed data or the vectors corresponding to the three points being located in a third region different from second region, output third data obtained by correcting the observed data.

4. The computing device of claim 1, wherein in response to the quantum processing device outputting the observed data projected onto the x-axis, y-axis, and z-axis, the error mitigator calculates three vector values on a Bloch Sphere based on the observed data, and outputs data corrected based on the calculated three vector values.

5. The computing device of claim 1, further comprising an optimizer configured to feed back data, modified based on the data corrected by error mitigation by the error mitigator, to the quantum processing device.

6. The computing device of claim 5, wherein by performing a cost function-based minimization or maximization based on the corrected data, the optimizer feeds back the modified data to the quantum processing device.

7. The computing device of claim 1, wherein in response to the quantum processing device comprising parallel quantum processors, the error mitigator receives data which are observed by the parallel quantum processors of the quantum processing device, and performs error mitigation by using the observed data.

8. The computing device of claim 1, wherein the conversion device performs gate conversion according to set gate depth for converting the data based on the first domain into the data based on the second domain.

9. The computing device of claim 1, wherein the conversion device comprises:
   a first axis converter configured to convert the data based on the first domain into the data based on the second domain in the x-axis;
   a second axis converter configured to convert the data based on the first domain into the data based on the second domain in the y-axis; and
   a third axis converter configured to convert the data based on the first domain into the data based on the second domain in the z-axis.

10. The computing device of claim 9, wherein the first interface comprises:
    a first output device configured to output a first instruction queue based on the data based on the second domain in the x-axis which is received from the first axis converter;
    a second output device configured to output a second instruction queue based on the data based on the second domain in the y-axis which is received from the second axis converter; and
    a third output device configured to output a third instruction queue based on the data based on the second domain in the z-axis which is received from the third axis converter.

11. A quantum computing system comprising:
    a computing device; and
    a quantum processing device,
    wherein the computing device comprises:
    a conversion device configured to convert data based on a first domain into data based on a second domain corresponding to a quantum domain;
    a first interface configured to output the data based on the second domain from the conversion device to a quantum processing device;
    a second interface configured to receive data processed by the quantum processing device; and
    an error mitigator configured to perform error mitigation on the data received from the second interface.

12. The quantum computing system of claim 11, wherein the quantum processing device outputs observed data in x-axis, y-axis, and z-axis based on the data based on the second domain.

13. The quantum computing system of claim 11, wherein the quantum processing device comprises:
    a first quantum processor configured to output observed data in the x-axis based on the data based on the second domain;
    a second quantum processor configured to output observed data in the y-axis based on the data based on the second domain; and
    a third quantum processor configured to output observed data in the z-axis based on the data based on the second domain.

14. The quantum computing system of claim 13, wherein the first quantum processor to the third quantum processor operate in parallel independently of each other.

15. The quantum computing system of claim 11, wherein the quantum processing device comprises a quantum processor which, based on the data based on the second domain, is configured to output the observed data in the x-axis at a first time, to output the observed data in the y-axis at a second time after the first time, and to output the observed data in the z-axis at a third time after the second time.

16. The quantum computing system of claim 15, wherein the first interface comprises a parallel-serial output device configured to sequentially output a first instruction queue corresponding to the data based on the second domain in the x-axis, a second instruction queue corresponding to the data based on the second domain in the y-axis, and a third instruction queue corresponding to the data based on the second domain in the z-axis.

17. The quantum computing system of claim 11, wherein an operating temperature of the quantum processing device is lower than an operating temperature of the computing device.

18. The quantum computing system of claim 17, wherein the operating temperature of the quantum processing device is −270° C. or less.

19. The quantum computing system of claim 11, wherein the error mitigator receives observed data in x-axis, y-axis, and z-axis from the quantum processing device, and performs the error mitigation by using the observed data.

20. The quantum computing system of claim 11, wherein the error mitigator is configured to:
- in response to three points in the observed data or vectors corresponding to the three points being located in a first region, output first data obtained by correcting the observed data;
- in response to the three points in the observed data or the vectors corresponding to the three points being located in a second region different from first region, output second data obtained by correcting the observed data; and
- in response to the three points in the observed data or the vectors corresponding to the three points being located in a third region different from second region, output third data obtained by correcting the observed data.

* * * * *